Patented July 1, 1930

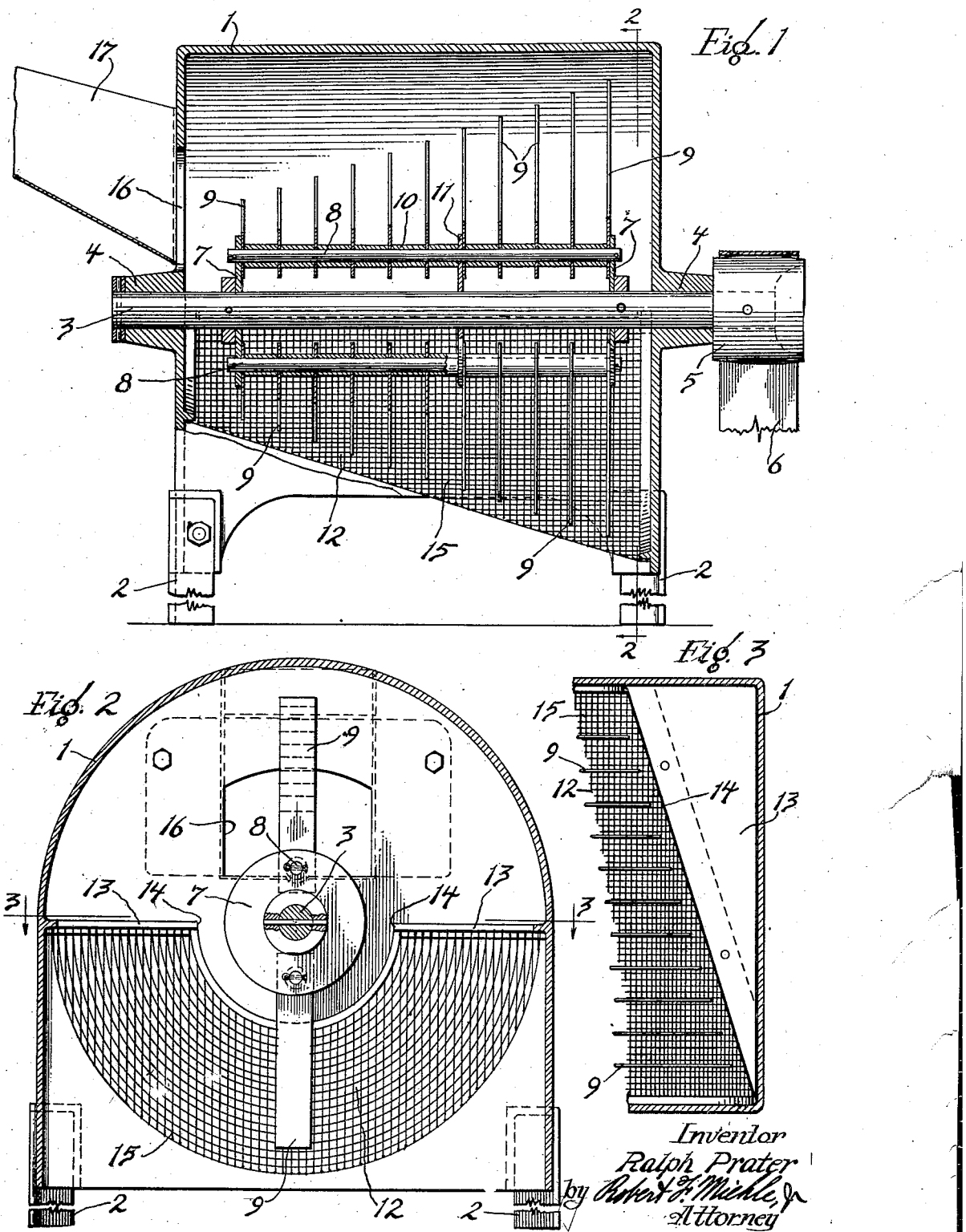

1,768,713

UNITED STATES PATENT OFFICE

RALPH PRATER, OF CHICAGO, ILLINOIS

GRINDER

Application filed March 17, 1927. Serial No. 175,997.

My invention relates particularly to grinders of the type adapted for reducing materials of various kinds, and is particularly adapted for "cracking" corn although not limited to this use alone.

The main object of the invention resides in the provision of a simple and efficient grinder of the above type which is adapted to reduce material to a more or less uniform size without necessarily producing a considerable percentage of undesired meal or finely pulverized material, and which requires a comparatively small amount of power for operation.

With this object in view my invention consists in certain features of novelty in the construction, combination, and arrangement of parts by which the said object and certain other objects hereinafter appearing are effected all as fully described with reference to the accompanying drawing and more particularly pointed out in the appended claims.

In the said drawing—

Figure 1 is a central vertical longitudinal section of a grinder embodying my invention;

Figure 2 is a section on the line 2—2 of Figure 1;

Figure 3 is a partial section on the line 3—3 of Figure 2.

Like characters of reference indicate like parts in the several views.

Referring to the drawing, 1 designates a casing the upper portion of which is semicircular on a horizontal axis and substantially uniform in size longitudinally of said axis. See Figures 1 and 2. The walls of the casing extend downwardly from said upper portion and legs 2 secured at the lower ends of said walls support the casing in an elevated position. A revoluble shaft 3 extends through the casing in coaxial relation with the upper portion thereof and is journaled in suitable bearings 4 on the end walls of the casing. A pulley 5 is secured on the shaft 3 on the outside of the casing for rotation of the shaft from a suitable source of power through the medium of a belt 6.

Secured on the shaft 3 within the casing adjacent the respective ends of the enclosure thereof are two disks 7, and mounted on these disks and extending therebetween in diametrically opposite relation with and in parallelism with the shaft 3 are two rods 8. Pivotally mounted on the rods 8 between the disks 7 are two sets of blades or hammers 9 which are maintained in spaced relation by means of spacing collars 10 on the rods, and another disk 11 embraces the shaft 3 and the rods 8 intermediate the disks 8 to resist bending of the rods under centrifugal force. The blades 9 on each rod 8 are of different lengths and consequently have different radii and are arranged correspondingly and in progression corresponding with their radii for purposes hereinafter described.

The lower portion of the casing is open to form a bottom discharge opening extending the entire length of said progression of blades, as designated at 12, and horizontal wall portions 13 are formed on the casing in the horizontal plane of the shaft 3 on opposite sides thereof and these wall portions extend from the wall of the upper portion of the casing inwardly and have their inner edges 14 disposed adjacent to and extending in correspondence with the periphery of the paths of the blades 9 effected by rotation of the shaft 3, centrifugal force maintaining the blades in radial relation with the shaft during rotation thereof at operating speed. See Figures 2 and 3. A uniform sizing screen 15 is secured with the casing in a suitable manner and covers all of the discharge opening 12 and extends from the inner edges 14 of the wall portions 13 below the same around the lower portion of the periphery of the paths of the blades 9 in equidistant adjacency thereto.

The casing 1 is provided with an inlet opening 16 at the end thereof adjacent the end of the progression of blades having the smallest radius, a suitable hopper 17 being provided for the convenient feeding of material through the inlet opening into the casing.

In operation the shaft 3 is driven at a suitable speed and material to be reduced is fed into the casing through the inlet opening 16, and as it is reduced sufficiently it discharges through the screen 15. By reason of the different radii of the blades 9 they are adapted to strike the material in the casing with force varying with their radii. As the material is fed into the casing it first encounters the blades of the smallest radii and accordingly is subjected to the weakest blows, and as the material progresses in the casing away from the inlet end thereof it is subjected to blows of gradually increasing force until it is reduced sufficiently to pass through the screen 15. Thus, it will be observed that the material is subjected to the action of the blades 9 only until it is sufficiently reduced to pass through the screen, as it may discharge at any point in its passage in the casing away from the inlet opening where it has been sufficiently reduced to pass through the screen and is not subjected to more blows of greater force than are necessary for reducing it to the desired size. Thus is the percentage of undesired meal or finely pulverized material reduced and the already sufficiently reduced material discharging directly out of the casing does not interfere with the reduction of other material with obvious advantage both as to efficiency in reduction and power required for operation.

By reason of the form of the upper portion of the casing, which it will be observed is uniform in size longitudinally of the shaft 3 and does not conform with the periphery of the paths of the progression of blades 9, space is provided wherein material, which after encountering all of the blades 9 is not reduced sufficiently to pass through the screen 15, is passed back toward the inlet opening for additional action by the blades. It will be observed that the wall portions 13 provide shelf surfaces which are particularly advantageous in the reduction of material of comparatively large size, such as ear corn, as they have a tendency to advantageously retard rotation of the material with the blades 9 and to churn the material.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a grinder the combination with a casing, of a plurality of coaxially disposed rotatory reducing devices of different radii within said casing and arranged in progression corresponding with their radii, said casing having one portion thereof of substantially uniform size longitudinally of the axis and said reducing devices and having an inlet opening adjacent the end of said progression having the smallest radius and having a discharge opening in the other portion thereof extending substantially the entire length of said progression, wall portions on said casing disposed on opposite sides of the path of said progression intermediate the said portions of the casing and extending from the walls of said first mentioned portion inwardly and having their inner edges disposed adjacent to and extending in correspondence with the periphery of the paths of said reducing devices, and a uniform sizing screen covering all of said discharge opening and extending from said inner edges of said wall portions and in said second mentioned portion of the casing around the corresponding portion of the periphery of the paths of said reducing devices in equidistant adjacency therewith.

2. In a grinder the combination with a casing, of a horizontal revoluble shaft extending through said casing in central relation therewith, a plurality of reducing members of different radii carried by said shaft for rotation therewith and arranged in progression corresponding with their radii, said casing having the enclosure of the upper portion thereof of substantially uniform size longitudinally of said shaft and having an inlet opening adjacent the end of said progression having the smallest radius and a bottom discharge opening in the lower portion thereof extending substantially the entire length of said progression, horizontal wall portions on said casing disposed in the horizontal plane of said shaft on opposite sides thereof, and extending from the wall of said first mentioned portion inwardly and having their inner edges disposed adjacent to and extending in correspondence with the periphery of the paths of said reducing devices, and a uniform sizing screen covering all of said discharge opening and extending from said inner edges of said wall portions below the same around the lower portion of the periphery of the paths of said reducing devices in equidistant adjacency thereto.

In witness whereof I hereunto affix my signature this fourteenth day of March, 1927.

RALPH PRATER.